Figure 1:
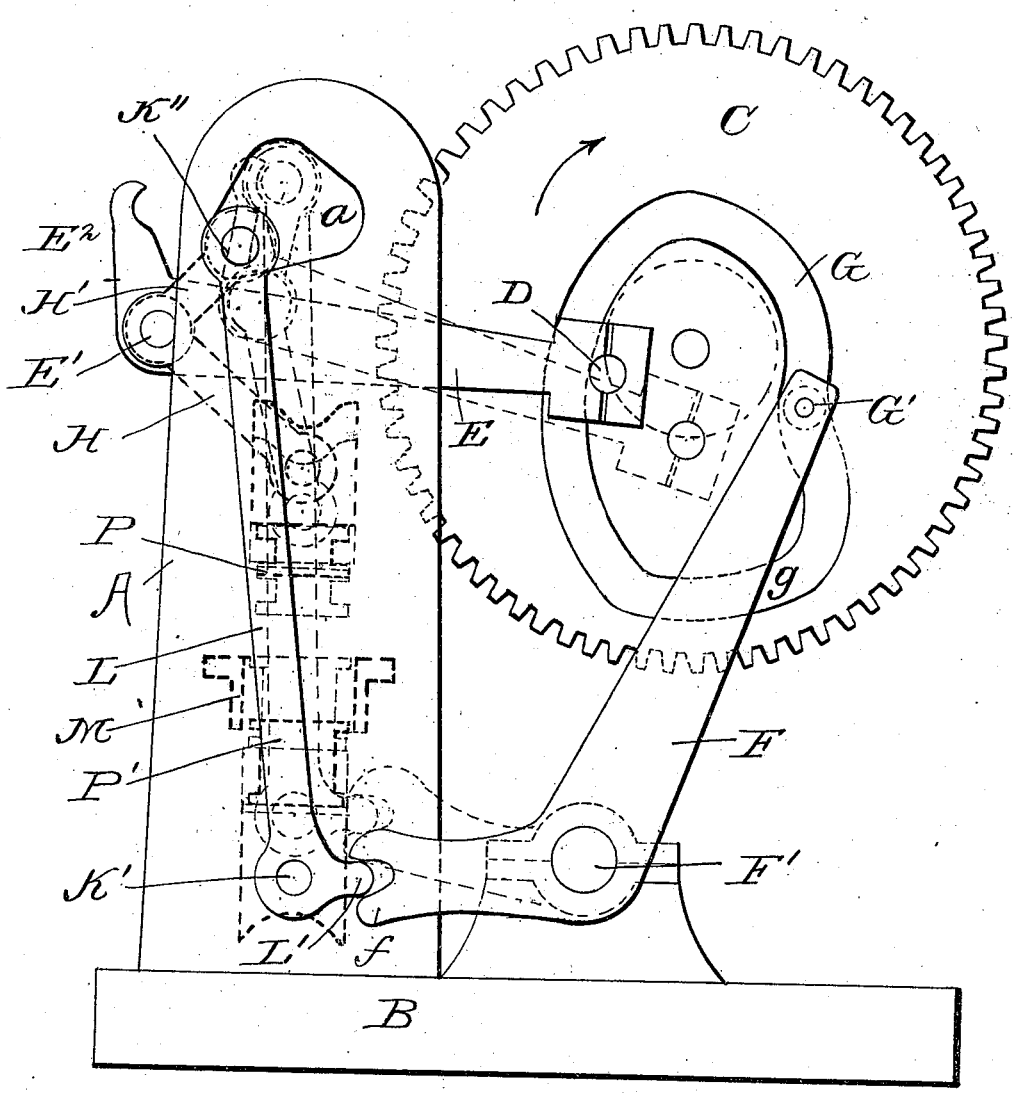

(No Model.)

A. D. THOMAS.
BRICK MACHINE.

No. 504,141. Patented Aug. 29, 1893.

2 Sheets—Sheet 1.

WITNESSES:
F. L. Ourand
Edwin McKee

INVENTOR:
Albert D. Thomas.
by Saml. J. Wallace,
Attorney.

(No Model.) 2 Sheets—Sheet 2.
A. D. THOMAS.
BRICK MACHINE.
No. 504,141. Patented Aug. 29, 1893.
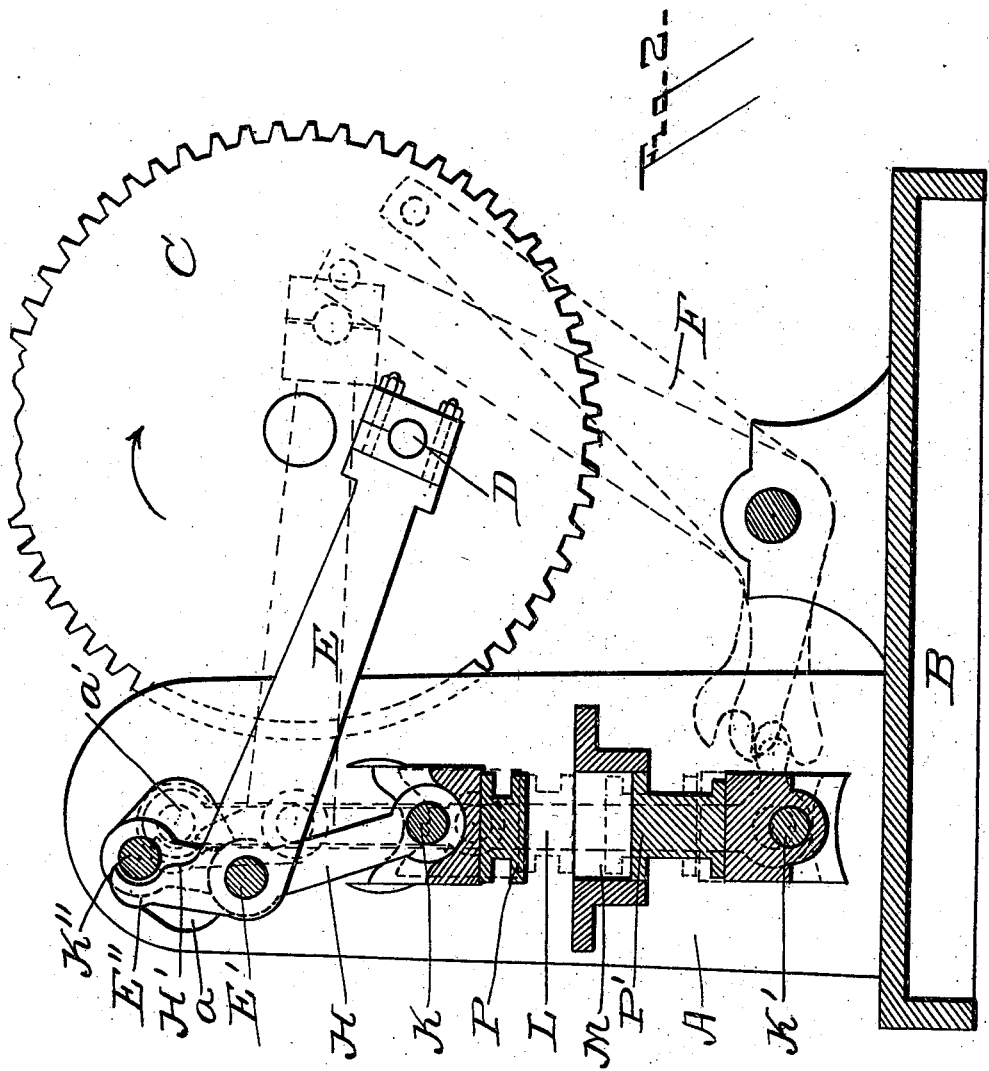
Witnesses:
F. L. Ourand.
Edwin McKee
Inventor:
Albert D. Thomas.
by Saml. J. Wallace,
Attorney.

UNITED STATES PATENT OFFICE.

ALBERT D. THOMAS, OF KEOKUK, IOWA, ASSIGNOR TO H. O. WHITNEY, OF SAME PLACE.

BRICK-MACHINE.

SPECIFICATION forming part of Letters Patent No. 504,141, dated August 29, 1893.

Application filed March 15, 1893. Serial No. 466,115. (No model.)

*To all whom it may concern:*

Be it known that I, ALBERT D. THOMAS, a citizen of the United States, residing at Keokuk, in the county of Lee and State of Iowa, have invented a new and useful Improvement in Brick-Machines, which is made and used substantially as set forth hereinafter, and as shown in the accompanying drawings, in which—

Figure 1 is a side view of a brick machine, part being broken away. Fig. 2 is a similar view in section.

This invention consists in a new and improved machine for making brick of a consistency suitable for hacking up direct; and in some details thereof. This improved machine is made in some respects similar to those of my Patents No. 315,855, of April 14, 1885, and No. 375,660, of December 27, 1887, to which I refer for further particulars. The machine has a general frame with upright side parts A, connected by a base B, and bearing the working parts. It has a main driving wheel C, to be suitably driven, arranged to operate the working parts through two main levers E, F, and a crank D and cam way G, arranged to cause the several actions and reactions in proper order. The lever E, is borne by the crank D, and has a compound series of motions given by this crank at one end and by the peculiar motions given by lever F, through its connections at the other end. The free end of lever E, bears a pivot pin E' bearing two link bars H, H', forming a knuckle joint thereon, and a hook E², similar to those in my Patent No. 375,660, referred to, but different in some details, all operated as by a pitman lever. The lever F, is mounted on a fixed fulcrum F' and has a pin G' on one end, which runs in a peculiar shaped cam channel way G, in the face of wheel C, so as to receive peculiar motions for operating the mold plungers in relation to the molds and the motions of lever E. The lower end of lever F is forked so as to engage with the spurs L' on the lower ends of the main link bars L, on the two outer faces of the uprights A, by means of jaws *f*, on each fork, or in any suitable way, so as to give these bars up and down motions to open the molds to receive clay, and then press it in the mold, and finally push the finished brick out at the top. The molds M, are formed similar to those in my previous patents. They are provided with upper and lower plungers P P', mounted in guide ways between frame parts A, which hold them firmly in place while free to move up and down in use, and apply enormous pressure to compress pulverized clay into compact brick, and to discharge them from the molds, and their upper edges form part of the table used in filling the molds and discharging the brick. The lower plungers P', are mounted on heavy pivot pins K', held by and moving with link bars L, as operated by lever F, and guide way G, through spur L'. These plungers move so as to reach the position shown in full lines in Fig. 2, when the molds receive clay to form the brick, and then so as to reach the top of the mold at the time for the discharge of the pressed brick, as shown by the light dotted lines in Fig. 1. They move very rapidly downward and very slowly upward. The upper plungers P, are hung on heavy pivot pins K, held by and moving with link bars H, as operated by the united motions of levers E and F. They move so as to reach the position shown in heavy dotted lines in Fig. 1, when the brick are being discharged and clay being received for new brick, and so as to reach deep enough in the mold to press the brick hard, moving rapidly down till they enter the mold and then slowly down and upward while compressing the clay very hard. The up and down motions are given by lever F, mainly, through link L to both sets of plungers so that they will move differently to suit their separate purposes, but together with a gradually decreasing approach to each other in compressing the brick while keeping it in motion up, down and up in the mold. The difference in the motions of the two sets of plungers is given by lever E, and the guide way *a* in the upper part of frame A, around in which the pivot pin K² moves so as to control the action of lever E, and consequently the motion of plungers P, held by link bars H, while pin K² is held as to height by link bar L controlled by lever F. In the series of movements given by these means, when the brick have been discharged and both sets of plungers are in their highest positions, as shown in Fig. 1, by light dotted lines below and heavy dotted lines above, the pin G' of lever F, will be in the groove G, at point g, and the lever F, will be in position as shown by dotted lines in Fig. 2, farthest from the center of wheel C. From these positions wheel C will rapidly bring the two levers E, F, into the positions shown in full lines in Fig. 1, and the lower set of plungers to the bottom of the molds so as to admit the feeding of clay for new brick, while the upper plungers are held stationary, to allow the clay to be pushed into the mold, in the manner shown in dotted lines in Fig. 1, of Patent No. 315,855, by the feeder which pushes away the brick, and levels off the clay after filling. While the lower plungers are thus going down, the upper plungers are held without material motion, although the link bars L go down with lever F as it is moved by the cam way G in the part from point $g$ to that occupied by the pin of lever F in Fig. 1, because the lever E at the same time moves into the position shown in full lines in Fig. 1, bending the knuckle joint formed by link bars H, H', so as to allow the upper pivot pin K'', to descend in guide way $a$, as shown, from the highest position shown in dotted lines in Fig. 1, as carried down by link bars L, with the lower plungers, and allow the pivot pin K, with the upper plungers to remain stationary, through the outthrust of pitman E as in Fig. 1. When the parts have reached the positions shown in full and heavier dotted lines in Fig. 1, and the molds have been filled with clay, and the clay carrier is removed leveling it off full in the molds, the rotary motion of wheel C, rapidly draws back its pitman E, and thus straightens the knuckle joint of link bars H, H', on it, which are held down by link bars L, so as to rapidly push down the upper plungers P, to the molds and then move slowly to their lowest points therein to compress the clay very hard thereby. When the upper plungers in this way enter the molds and begin to compress the clay in them the lower plungers also begin to move to compress the brick against such action; caused by the peculiar form of cam way G. In this way the lower plungers rise for some distance compressing the clay in the molds against the upper plungers descending therein, and then the lower plungers are arranged to turn and descend to their lowest position again by a change in the course of groove G, while the upper plungers continue to descend, more rapidly than the lower, so that the brick continue to be compressed between them. When both sets of plungers have thus reached their lowest points with the brick partly pressed between them, the motion of the wheel with crank D, carries the end of the pitman E, rapidly downward so as to first draw the pivot pin E', past a vertical line over the molds and pin K, so as to let the upper plungers rise slightly, while at the same time the course of groove G changes so as to move the lower plungers up after them fast enough to still keep up the compression of the brick; the object being to keep the brick moving in the mold to keep it from sticking fast at any point.

This upward motion of both sets of plungers in the molds is continued by the course of groove G, for the lower plungers, and by the motion of crank D, downward turning the pitman E as a lever on pivot E' so as to bring hook E² against pin K'' so as to bring that from the position shown in full lines in Fig. 1, up the inclined bottom of guide way $a$, toward the position $a'$, shown in dotted lines in Fig. 2, at a higher level, which draws up the upper plungers and draws up the lower still faster by link bars L, thus continuing the compression of the brick, until all the pivot pins K', K, E', and K'', and their link bars H', H and L, and the plungers P, P, and the molds M, are brought into one straight vertical line so as to produce the greatest pressure on the brick, in the positions shown by dotted lines in Fig. 2, by the time the brick reaches the top of the mold, and is ready to begin its discharge. The brick thus moves from the bottom to the top of the mold while it is being compressed to its highest point which enables the pressure to be distributed throughout its whole mass to produce a uniform consistency of the greatest compression throughout the brick. When the compression of the brick has been completed thus, and it is ready to be pushed out, being already in motion in the mold and without any resisting set to its walls, avoided by keeping the brick in motion down and up while being compressed, and being well polished and perfected on its edges thereby, the motion of wheel C, will push back the pitman E, and pivot E', so as to bend the knuckle joint of bars H, H', and so release the upper plungers from the brick while all continue to be raised rapidly by lever F, and cam groove G, now approaching the outer edge of wheel C. In this movement the wall of guideway $a$, inclines laterally so as to turn the upper ends of link bars away from the vertical to fully relieve the upper plungers from the brick, so that it may be freely removed by pushing sidewise on the table when the lower plungers reach the top of the mold. When the brick are thus discharged both sets of plungers are at their highest positions as shown in Fig. 1, the upper plungers in heavy dotted lines and the lower in light dotted lines, and the pivot K'' is at the top of its course as shown in dotted lines in Fig. 1, and the pitman is moving from its dotted to its full line position in Fig. 1, before it reaches the latter. At the time when the brick are out of the mold the pin G' of lever F reaches the outermost point in groove G, by the turning of wheel C, and lever $f$, and the lower plungers are held stationary at this point by a true circular part of the groove G, up to point $g$, to allow the brick to be removed by being shoved aside by the mold filler, not shown, but shown in prior patent. When point $g$ is reached and the brick has been shoved away, and the mold filler full of clay has come over the molds, the pin G′, begins a rapid inward course in groove G, to the position shown in full lines in Fig. 1, which moves the lever F, so as to take the lower plungers down and allow the clay to fill the molds, the link bar L and pivot K″ descending to the positions in full lines in Fig. 1, ready for a like series of actions to form another set of bricks.

I claim—

1. A brick machine having a drive wheel C, a lever F, having a pin running in a guide way in said wheel, and a pitman lever moved by a crank thereon, molds M, having two sets of plungers working therein connected together by link bars L, H′, H, connected with said levers so as to be operated by them.

2. A brick machine having a mold and two plungers therein combined with mechanism for operating said plungers constructed and arranged to give the lower plunger an up and down and up motion while compressing the brick.

3. In a brick machine a knuckle joint of link bars H, H′, and means for operating them in compressing the brick, and a guide way $a$, combined with a separate means for giving vertical motion thereto.

4. In a brick machine the combination of a wheel having a cam way, with a lever operated by said cam, a mold having two opposed plungers each connected with said lever by means adapted to give motion thereto, and a separate mechanism connected with one plunger and adapted to give motion to it additional to the motion given it by the lever and cam.

5. A brick machine having upper and lower plungers, both movable in molds, and link bars, to operate the lower plungers, provided with spurs or means of engagement connecting a lever arranged to operate them to shove the brick out of the molds, and a lever bar or means for operating the link bars and other compressing mechanism.

6. A brick machine having a mold with two opposed plungers movable therein, combined with a wheel having a lever with a cam way to operate it, and a pitman with a crank to operate it, each connected with both plungers and arranged to operate both of them.

7. In a brick machine a stationary mold and two opposed plungers operative therein, combined with a lever and a pitman, or means, connected to both plungers, and arranged to give to each plunger both a down and up motion in the mold while compressing a brick between them.

8. The mode of forming a brick which consists in filling a mold with pulverized clay and compressing it between upper and lower plungers therein, moving the lower plunger upward most rapidly, then moving both plungers downward, the upper, most rapidly, and then moving both upward, the lower, most rapidly, until the brick is compressed and polished.

9. The mode of compressing pulverized clay in a mold between plungers which consists in moving both plungers one way and then the other way in the mold while approaching each other.

ALBERT D. THOMAS.

Witnesses:
WILLIAM C. HOWELL,
CHARLES V. EFNER.